US006776551B2

(12) United States Patent
Linnenbuerger

(10) Patent No.: US 6,776,551 B2
(45) Date of Patent: Aug. 17, 2004

(54) RETAINING DEVICE

(75) Inventor: Jan Linnenbuerger, Dettenhausen (DE)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/956,027

(22) Filed: Sep. 20, 2001

(65) Prior Publication Data

US 2002/0040953 A1 Apr. 11, 2002

(30) Foreign Application Priority Data

Sep. 29, 2000 (GB) ................................ 0023849

(51) Int. Cl.$^7$ ................................ F16C 11/06
(52) U.S. Cl. ............................ 403/90; 24/19; 385/62; 385/137; 403/362; 403/373
(58) Field of Search ............... 403/344, 90, 289, 403/290, 362, 367, 373; 248/181.1, 181.2, 74.1; 269/287; 385/60, 62, 64, 66, 69, 75, 78, 80, 81, 82, 84, 87, 137, 139; 24/535, 19, 569

(56) References Cited

U.S. PATENT DOCUMENTS

| | | | | | |
|---|---|---|---|---|---|
| 1,806,687 A | * | 5/1931 | Hoover | ....................... | 403/312 |
| 2,338,343 A | * | 1/1944 | Maire | ......................... | 279/43 |
| 3,354,672 A | | 11/1967 | Klueui | | |
| 3,776,649 A | * | 12/1973 | Kemezys | ..................... | 403/90 |
| 3,815,892 A | * | 6/1974 | Tulk | ........................ | 248/181.1 |
| 3,946,467 A | * | 3/1976 | Lukas et al. | ................... | 24/537 |
| 6,116,845 A | * | 9/2000 | Wright et al. | ................. | 269/77 |
| 6,413,006 B1 | * | 7/2002 | Neugart | ...................... | 403/290 |

FOREIGN PATENT DOCUMENTS

| | | |
|---|---|---|
| EP | 0 508 686 B1 | 10/1992 |
| FR | 2388373 | * 11/1978 |
| WO | WO 98/50728 A1 | * 11/1998 |

OTHER PUBLICATIONS

Stegmann, "Hollow Shaft Incremental Transducer", 1996.

* cited by examiner

*Primary Examiner*—James R. Brittain
(74) *Attorney, Agent, or Firm*—Oliff & Berridge, PLC

(57) ABSTRACT

A retaining device comprises a holder for receiving an object and a clamp 4. The holder comprises a cylindrical sleeve 1 with three longitudinal cut-out slits 3 spaced 120° apart and a base 2 secured at one end. The inner surface of the clamp 4 has three lobes 11,12,13 also spaced 120° apart. The portions midway adjacent lobes contact the portions of the sleeve midway adjacent slits 3, resulting in a symmetrical force being applied to the circumference of the sleeve 1 when the clamp 4 is tightened. The clamp 4 is free from the base 2 of the holder and is not rigidly attached to the sleeve 1 and thus does not apply unequal forces to the holder when the clamp is tightened. Alternatively the sleeve 1 may have a thin continuous wall which deforms when forces are applied to it by the clamp 4. The object inserted into the sleeve may have a spherically shaped portion to allow is to be angularly adjusted in the sleeve before the clamp is tightened.

18 Claims, 4 Drawing Sheets

RETAINING DEVICE

Figure 1:
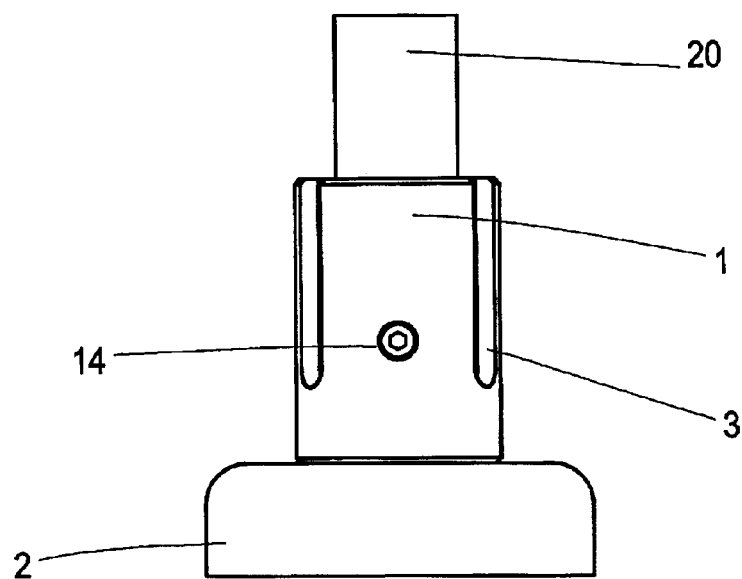

The present invention relates to a retaining device suitable for holding an object in a desired position.

Such retaining devices typically comprise a clamping device having a pair of jaws which enclose a cylindrical bore. An object may be retained in the cylindrical bore by tightening a clamping bolt which is in screw threaded engagement with both of the jaws of the clamping device. Such a device is disclosed in European Patent No. 0508686.

The above-mentioned retaining device has the disadvantage that as the clamping device is tightened, the object to be retained is pushed slightly to one side. This movement is caused by the unsymmetrical forces applied on the object by the clamping device which tends to "pinch" the object. If the clamping device is rigidly secured to a base of the retaining device, this increases the tendency of the object to be moved on tightening of the clamping device.

According to a first aspect of the present invention a retaining device for releasably retaining an object in a fixed position comprises:

a holder into which the object is inserted;
a clamping device which surrounds the circumference of the holder, which when tightened applies forces at symmetrical points around the circumference of the holder which in turn transmits symmetrical clamping forces to the object;
wherein the holder is a deformable tube and deforms in shape when the clamping device is tightened.

According to a second aspect of the present invention a retaining device for releasably retaining an object in a fixed position comprises:

a holder into which the object is inserted;
a clamping device which surrounds the circumference of the holder, which when tightened applies forces at symmetrical points around the circumference of the holder which in turn transmits symmetrical clamping forces to the object;
wherein an object to be inserted into the holder is provided with a spherically shaped portion such that the object may be angularly adjusted about all three axes inside the holder until the clamping device is tightened to fix the object in position.

According to a third aspect of the present invention a retaining device for releasably retaining an object in a fixed position comprises:

a holder into which the object is inserted;
a clamping device which surrounds the circumference of the holder, which when tightened applies forces at symmetrical points around the circumference of the holder which in turn transmits symmetrical clamping forces to the object;
wherein the clamping device has an inner surface comprising a plurality of recessed lobes located about the longitudinal axis of the holder, wherein only those portions of the inner surface between adjacent recessed lobes are in contact with the holder, and wherein those portions of the inner surface in contact with the holder are arranged symmetrically about the longitudinal axis of the holder.

According to a fourth aspect of the present invention a retaining device for releasably retaining an object in a fixed position comprises:

a holder into which the object is inserted;
a clamping device which surrounds the circumference of the holder, which when tightened applies forces at symmetrical points around the circumference of the holder which in turn transmits symmetrical clamping forces to the object;
wherein the clamping device comprises a U-shaped portion which surrounds the circumference of the holder and wherein the two arms of the U-shape may be pulled together to tighten the clamping device.

Figure 2:
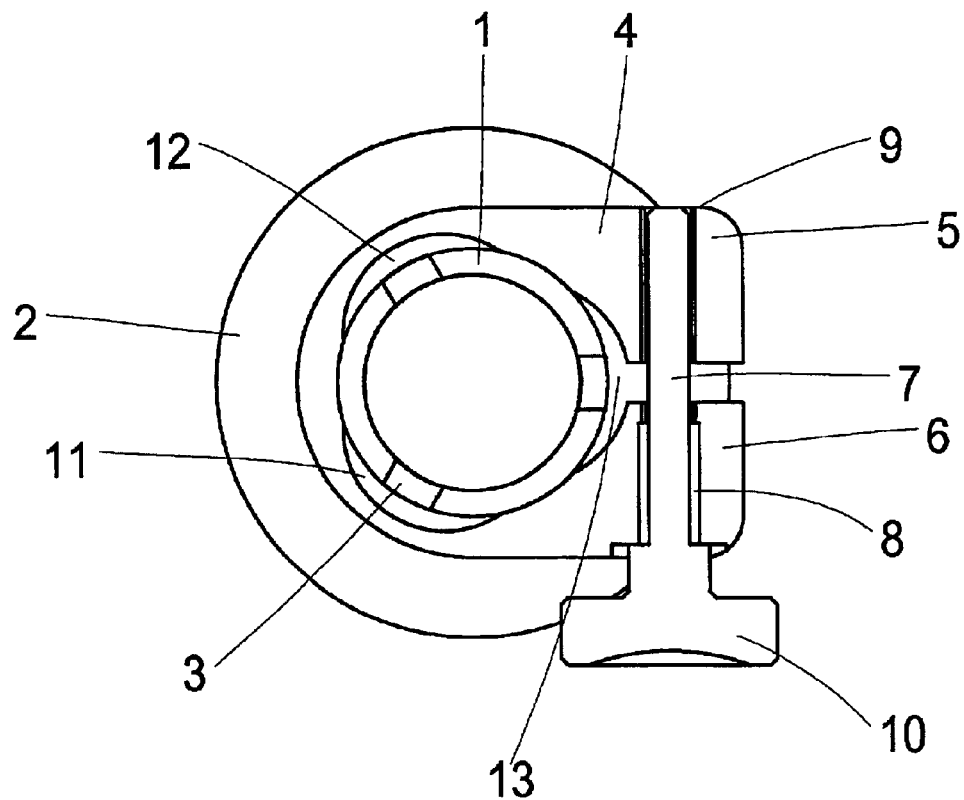
Figure 3:
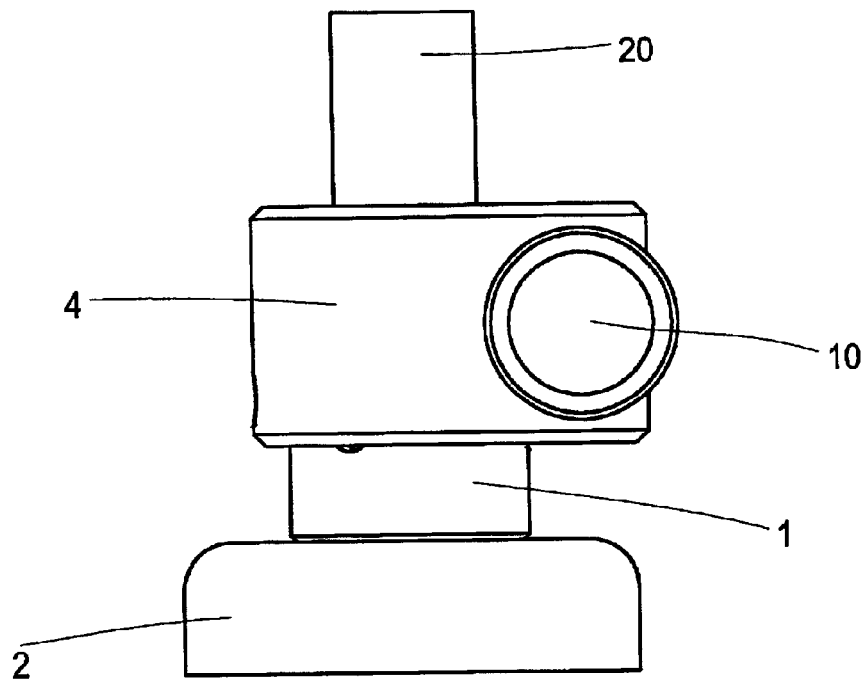
Figure 4:
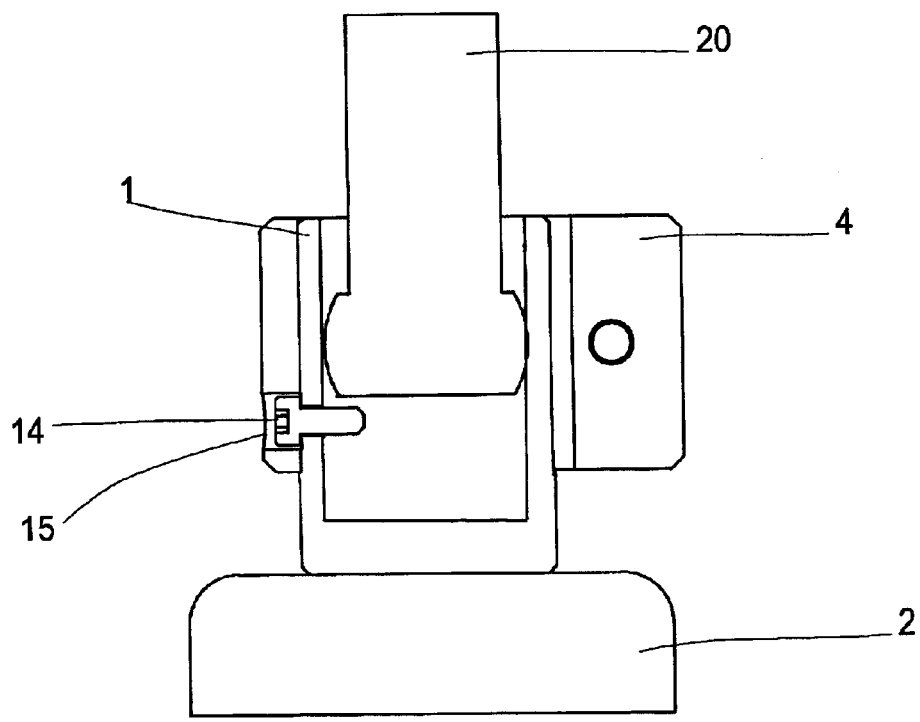
Figure 5:
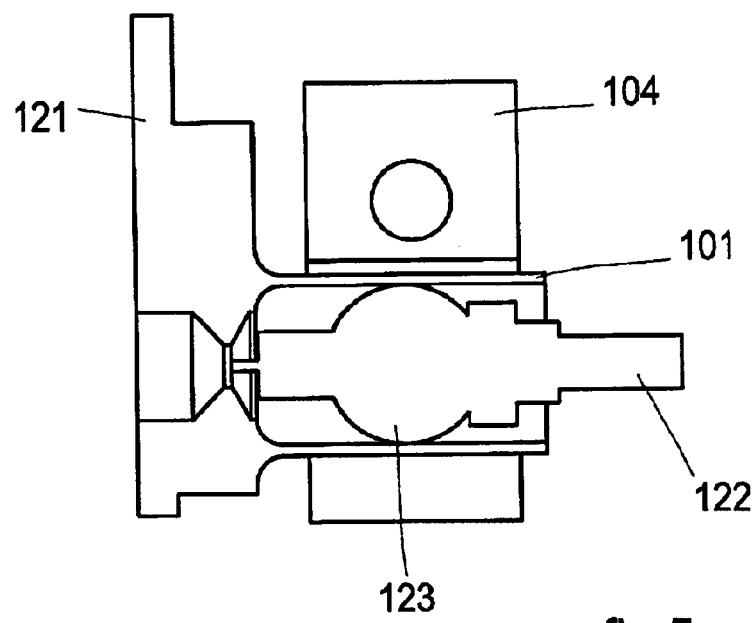
Figure 6:
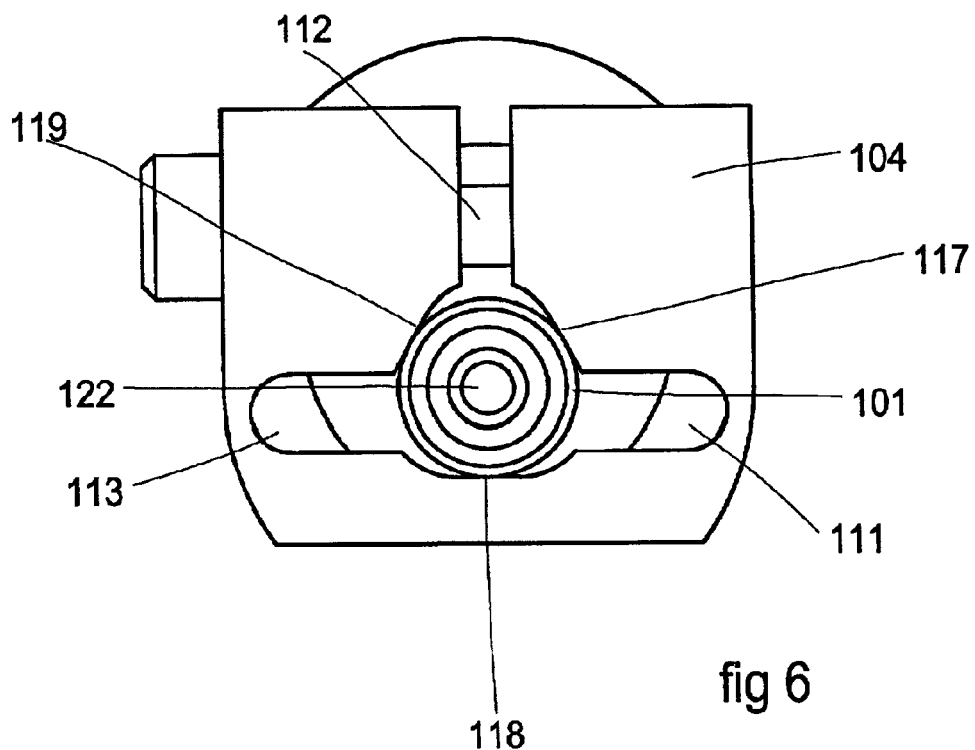
Figure 7:
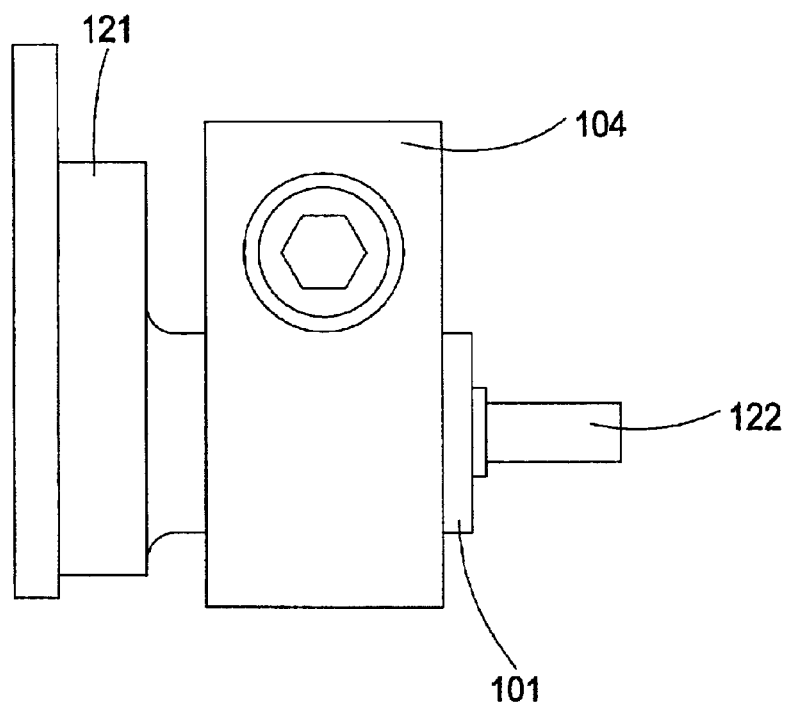
Figure 8:
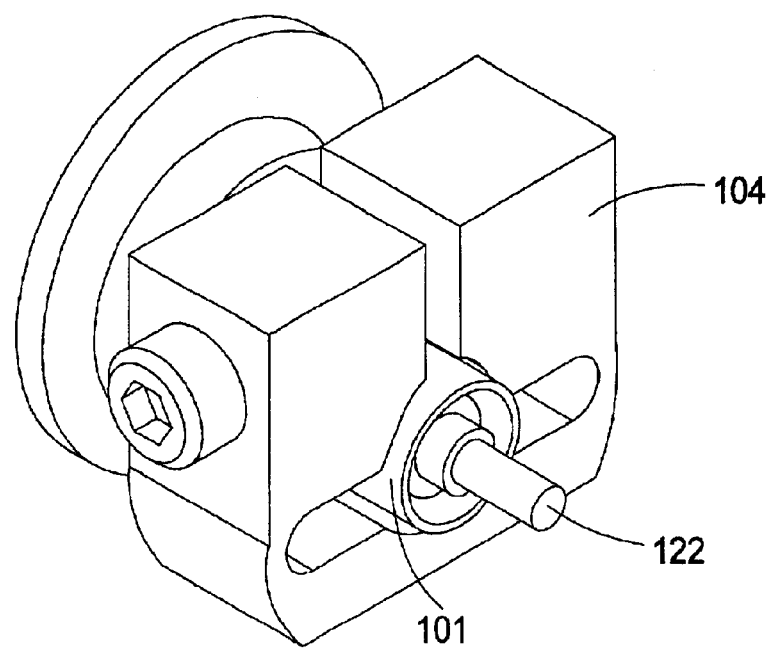

An embodiment of the invention will now be described, by way of example, and with reference to the accompanying drawings, in which:

FIG. 1 is a side view of the cylindrical holder;
FIG. 2 is a sectional plan view of the cylindrical holder with the clamping device;
FIG. 3 is a side view of the cylindrical holder with the clamping device;
FIG. 4 is a sectional side view of the cylindrical holder with the clamping device;
FIG. 5 is a sectional side view of the retaining device for fibre coupling;
FIG. 6 is an end view of the retaining device for fibre coupling showing the clamping device;
FIG. 7 is a side view of the retaining device for fibre coupling; and
FIG. 8 is a perspective view of the retaining device for fibre coupling.

Referring to FIGS. 1–4, the retaining device includes a cylindrical holder for receiving an object 20 to be retained, and a clamping device 4. The holder comprises a cylinder 1 secured at one end to a base 2. The base is magnetic so that it may be held in position securely on an iron-based work surface. The cylinder 1 has three longitudinal cut-out slits 3 spaced 120° apart and extending parallel to the longitudinal axis of the cylinder from the upper end to a region above the cylinder's lower end. Alternatively there may be more slits arranged symmetrically about the axis A of the cylinder or the cylinder may have no slits at all.

A U-shaped clamping device 4 surrounds the cylindrical holder. The clamping device has two arms 5,6 connected by a threaded bar 7 which is inserted into a first aperture 8 in arm 6 and into a second threaded aperture 9 in arm 5. The threaded bar is perpendicular to and offset from axis A. The threaded bar has a wheel 10 at one end, adjacent arm 6 and when the wheel is turned, the arms 5,6 move together which tightens the clamping device.

The inner surface of the clamping device has three lobes 11,12,13 spaced at 120° apart, corresponding to the positions of the slits 3 in the cylindrical holder. The only portions of the inner surface of clamping device in contact with the cylindrical holder are the portions midway between adjacent lobes which are in contact with the portions of the cylindrical holder midway between adjacent slits, resulting in a symmetrical force being applied to the circumference of the cylindrical holder about the axis A. This symmetrical force is perpendicular to axis A. The inner surface of the clamping device may be shaped to have more than three lobes to correspond to a cylindrical holder with more than three slits. The inner surface of the clamping device may have an alternative form, if it results in an equal force being applied at each position of the cylindrical holder midway between adjacent slits and therefore resulting in a symmetrical force being applied about the circumference of the cylindrical holder. The arrangement of the portions of the inner surface of the clamping device in contact with the holder is not limited to being in one plane.

The clamping device is held loosely in position on the cylindrical holder by a screw 14 passing through an aperture 15 in the clamping device opposite the arms 5,6 and into an aperture on the holder between adjacent slits. The aperture 15 on the clamping device has a diameter larger than the diameter of the screw head so that the screw head sits within the aperture, thus allowing the clamping device some movement with respect to the cylindrical holder. This arrangement holds the clamping device in position ready for use, yet as the clamping device is free from the base and is not rigidly attached to the cylindrical holder, it will not have the tendency to apply unequal forces to the cylindrical holder when the clamping device is tightened, which could result in the cylindrical holder being pushed to one side. Alternatively the clamping device may be free and only be held on the cylindrical holder by friction when it is tightened.

In use, the object to be retained is placed inside the cylindrical holder. The object and the cylindrical holder are moved together to the desired position on the work surface. The clamping device is then tightened to hold the object in the desired position, the magnetic base of the cylindrical holder keeping the retaining device in position. The cut-out slits allow the holder to deform and grip the object when the clamping device is tightened.

The retaining device is suitable for use with apparatus for calibrating a coordinate positioning machine (i.e. a ballbar as disclosed in EP 0508686). In this case object 20 is a spherical or part spherical carrying member which is supported on a machine table by the retaining device.

The spherical or part spherical portion of object 20 ensures that the object may be inserted into the retaining device and the clamping device tightened without changing the orientation of the object.

A second embodiment of the invention is shown in FIGS. 5–8. In this embodiment the retaining device is used to couple an optic fibre to a light source.

The light source is positioned in a housing 121 from which extends a cylindrical holder 101, into which the end of an optic fibre is inserted. The wall of the cylindrical holder is continuous (i.e. without cut-out slits) and is thin enough to allow it to deform when forces are applied to it by the clamping device.

A U-shaped clamping device 104 is positioned around the cylindrical device as in the previous embodiment. As before, three portions 117,118,119 of the inner surface of the clamping device are in contact with the cylindrical holder and are spaced at 120° around the circumference of the cylindrical holder so that they will apply a symmetrical force to the cylindrical holder when the clamping device is tightened. As the cylindrical holder has thin walls, the forces applied by the clamping device will cause it to deform. The portions of the cylindrical holder in contact with the inner surface of the clamping device will be pushed against the end of the optic fibre inserted into the cylindrical holder and will thus grip it more strongly. The portions of the cylindrical holder which are not in direct contact with the inner surface of the clamping device will bulge into the lobes of the clamping device. Thus the lobes 111,112,113 must be large enough to accommodate this deformity of the cylindrical holder. In this embodiment, the inner surface of the clamping device forms a T-shape, which still allows the points in contact with the cylindrical holder to be spaced at 120° and apply a symmetrical force.

In use, the end of an optic fibre 122 is inserted into the cylindrical holder 101 and its position is adjusted until it is coupled with the light source in the housing. The optic fibre 122 is retained in this position by tightening the clamping device. The end-piece of the optic fibre is shaped so that it incorporates a spherical or part spherical portion 123, at its point of largest diameter. As the angle of the optic fibre is adjusted with respect to the cylindrical holder, the spherical or part spherical portion always presents a uniform surface to the inner surface of the cylindrical holder. The end of the optical fibre may thus be angularly adjusted about all three axes (pitch, roll and yaw). The symmetrical forces applied to the cylindrical holder when tightening the clamping device result in the elimination of unwanted movement of the optic fibre.

Once the optic fibre has been positioned in the z-axis (i.e. parallel to the longitudinal axis of the optic fibre), it may be manipulated by hand to adjust the location of the optic fibre in the x and y axes. This is possible by extending the end of the optic fibre 122 opposite the housing 121, so that it acts as a mechanical lever, pivoting about 123.

To prevent contamination of dirt and grit, the recessed lobes of the clamping device may be filled with sealant once the optical fibre has been aligned and the clamping device tightened.

This retaining device may be used to align optic fibres to a variety of light sources, e.g. HeNe lasers and diode lasers. It would also be suitable for use in aligning optic fibres to other apparatus such as interferometers or couplers etc.

In addition to aligning an optic fibre to a light source, the retaining device may be used to align other optical devices such as prisms or mirrors. For example the retaining device may be used to align two half-silvered glass plates in a Fabry-Pérot interferometer which have been positioned a known distance apart. The first glass plate could be located in the housing 121 and the second glass plate located within the sphere 123.

Preferred embodiments of the present invention provides a retaining device in which the clamping device applies only symmetrical forces to the retained object, thus eliminating movement of the object on clamping. Furthermore, the clamping device is not attached to a base of the retaining device, thus removing a further cause of asymmetrical forces.

What is claimed is:

1. A retaining device for releasably retaining an object in a fixed position, comprises:
   a spherically shaped portion connected or connectable to the object;
   a holder into which the spherically shaped portion is inserted;
   a clamping device which surrounds the circumference of the holder; and
   a plurality of recesses provided between the inner surface of the clamping device and the holder, such that when tightened, the clamping device applies forces at symmetrical points around the circumference of the holder which in turn transmits symmetrical clamping forces to the object, wherein the holder is deformable and deforms in shape when the clamping device is tightened, the spherically shaped portion enables the object to be angularly adjusted about at least one axis inside the holder until the clamping device is tightened to fix the object in position, wherein the symmetrical clamping forces hold the object in said position without movement of said object during tightening of the clamping device, wherein the clamping device has an inner surface comprising a plurality of recesses located about the longitudinal axis of the holder, wherein only those portions of the inner surface between adjacent recesses are in contact with the holder, and wherein those portions of the inner surface in contact with the holder are arranged symmetrically about the longitudinal axis of the holder, and wherein after the clamping device is tightened, the recesses between the portions of the inner surface in contact with the holder are filled with sealant.

2. A retaining device for releasably retaining an object in a fixed position, comprises:

a spherically shaped portion connected or connectable to the object;

a holder into which the spherically shaped portion is inserted;

a clamping device which surrounds the circumference of the holder; and a plurality of recesses provided between the inner surface of the clamping device and the holder, such that when tightened, the clamping device applies forces at symmetrical points around the circumference of the holder which in turn transmits symmetrical clamping forces to the object, wherein the holder is deformable and deforms in shape when the clamping device is tightened, the spherically shaped portion enables the object to be angularly adjusted about at least one axis inside the holder until the clamping device is tightened to fix the object in position, wherein the symmetrical clamping forces hold the object in said position without movement of said object during tightening of the clamping device, and wherein said object is the end of an optical fibre.

3. An apparatus for adjusting the position of an optical fibre, comprising:

a spherically shaped portion connected or connectable to the optical fibre;

a holder into which the spherically shaped portion of the optical fibre is inserted:

a clamping device which surrounds the circumference of the holder; and a plurality of recesses provided between the inner surface of the clamping device and the holder, such that when tightened, the clamping device applies forces at symmetrical points around the circumference of the holder which in turn transmits symmetrical clamping forces to the object, wherein the holder is deformable and deforms in shape when the clamping device is tightened; and wherein the spherically shaped portion enables the optical fibre to be angularly adjusted about at least one axis inside the holder until the clamping device is tightened to fix the object in position.

4. The apparatus for adjusting the position of an optical fibre as claimed in claim 3, wherein the recesses are recessed lobes.

5. A retaining device for releasably retaining an at least part spherically shaped portion of a ball bar calibration apparatus in a fixed position comprises:

a holder into which the at least part spherically shaped portion is inserted;

a clamping device which surrounds the circumference of the holder; and a plurality of recesses provided between the inner surface of the clamping device and the holder, such that when tightened, the clamming device applies forces at symmetrical points around the circumference of the holder which in turn transmits symmetrical clamping forces to the at least part spherically shaped portion, wherein the holder is deformable and deforms in shape when the clamping device is tightened, the at least part spherically shaped portion enables angular adjustment about at least one axis inside the holder until the clamping device is tightened to fix the at least part spherically shaped portion in position, and wherein after the clamping device is tightened, the recesses between the portions of the inner surface in contact with the holder are filled with sealant.

6. A retaining device for releasably retaining an object in a fixed position comprises:

a spherically shaped portion connected or connectable to the object;

a holder into which the spherically shaped portion is inserted;

a clamping device which surrounds the circumference of the holder; and a plurality of recesses provided between the inner surface of the clamping device and the holder, such that when tightened, the clamping device applies forces at symmetrical points around the circumference of the holder which in turn transmits symmetrical clamping forces to the object, wherein the holder is deformable and deforms in shape when the clamping device is tightened, the spherically shaped portion enables the object to be angularly adjusted about at least one axis inside the holder and the holder is shaped to allow linear adjustment of the spherically shaped portion relative to the holder, until the clamping device is tightened to fix the object in position.

7. A retaining device for releasably retaining an object as claimed in claim 6, wherein the holder is cylindrical.

8. A retaining device for releasably retaining an object as claimed in claim 6, wherein the forces applied around the circumference of the holder are perpendicular to the longitudinal axis of the holder.

9. A retaining device for releasably retaining an object as claimed in claim 6, wherein the clamping device is not rigidly attached to the holder.

10. A retaining device for releasably retaining an object as claimed in claim 6, wherein the holder has a plurality of cut-out slits.

11. A retaining device for releasably retaining an object as claimed in claim 6, wherein the holder has three cut-out slits arranged symmetrically about the longitudinal axis of the holder.

12. A retaining device for releasably retaining an object as claimed in claim 6, wherein the clamping device has an inner surface comprising a plurality of recesses located about the longitudinal axis of the holder, wherein only those portions of the inner surface between adjacent recesses are in contact with the holder, and wherein those portions of the inner surface in contact with the holder are arranged symmetrically about the longitudinal axis of the holder.

13. A retaining device for releasably retaining an object as claimed in claim 6, wherein the holder is provided with a plurality of cut-out slits and wherein the clamping device is arranged such that the portions of the inner surface in contact with the holder contact the holder between adjacent slits.

14. A retaining device for releasably retaining an object as claimed in claim 6, wherein after the clamping device is tightened, the recesses between the portions of the inner surface in contact with the holder are filled with sealant.

15. A retaining device for releasably retaining an object as claimed in claim 6, wherein there are three points of contact between the clamping device and the holder.

16. A retaining device for releasably retaining an object as claimed in claim 6, wherein the holder is provided with a magnetic base.

17. A retaining device for releasably retaining an object as claimed in claim 6, wherein the clamping device comprises a U-shaped portion which surrounds the circumference of the holder and wherein the two arms of the U-shape may be pulled together to tighten the clamping device.

18. A retaining device for releasably retaining an object as claimed in claim 6, wherein the clamping device is tightened by a screw with an axis of rotation perpendicular to the longitudinal axis of the holder.

* * * * *